United States Patent
Cao et al.

(10) Patent No.: US 7,522,629 B2
(45) Date of Patent: Apr. 21, 2009

(54) SENDING SIGNALING MESSAGES TO CDMA CELLULAR MOBILE STATIONS

(75) Inventors: Binshi Cao, Bridgewater, NJ (US); Stinson Samuel Mathai, DesPlaines, IL (US); Albert Joseph Sawyer, Wheaton, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1147 days.

(21) Appl. No.: 10/346,030

(22) Filed: Jan. 16, 2003

(65) Prior Publication Data

US 2004/0141475 A1   Jul. 22, 2004

(51) Int. Cl.
  *H04B 7/212*   (2006.01)
  *H04L 12/56*   (2006.01)
(52) U.S. Cl. .................. 370/442; 370/278; 370/337
(58) Field of Classification Search ............... 370/528, 370/320, 496, 505, 522, 523, 335, 342, 278, 370/280, 282, 294, 321, 337, 347, 442
See application file for complete search history.

(56) References Cited

U.S. PATENT DOCUMENTS

| | | | | |
|---|---|---|---|---|
| 4,813,040 A | * | 3/1989 | Futato | 370/528 |
| 4,914,650 A | * | 4/1990 | Sriram | 370/235 |
| 5,612,955 A | * | 3/1997 | Fernandes et al. | 370/433 |
| 5,721,732 A | * | 2/1998 | Emeott et al. | 370/437 |
| 5,740,531 A | * | 4/1998 | Okada | 455/403 |
| 5,909,434 A | * | 6/1999 | Odenwalder et al. | 370/342 |
| 6,144,653 A | * | 11/2000 | Persson et al. | 370/337 |
| 6,252,865 B1 | * | 6/2001 | Walton et al. | 370/335 |
| 6,781,971 B1 | * | 8/2004 | Davis et al. | 370/329 |
| 6,985,866 B2 | * | 1/2006 | Nakagaki | 704/500 |
| 2001/0022782 A1 | * | 9/2001 | Steudle | 370/335 |

* cited by examiner

Primary Examiner—John Pezzlo

(57) ABSTRACT

A method and apparatus for transmitting signaling messages over the communication channel to a CDMA mobile station. If a one-half, one-quarter, or one-eighth frame voice packet is to be transmitted, augmenting that packet with signaling information to form, essentially, a full rate frame; if no more than N consecutive full rate frames are detected, deferring transmission of the signaling message, and thereafter, if another full frame voice frame is detected, substituting a frame of signaling information for the full frame voice frame. Advantageously, using this arrangement, most short signaling messages can be transmitted to a CDMA mobile station with minimal voice impairment.

8 Claims, 2 Drawing Sheets

SENDING SIGNALING MESSAGES TO CDMA CELLULAR MOBILE STATIONS

TECHNICAL FIELD

Figure 1:
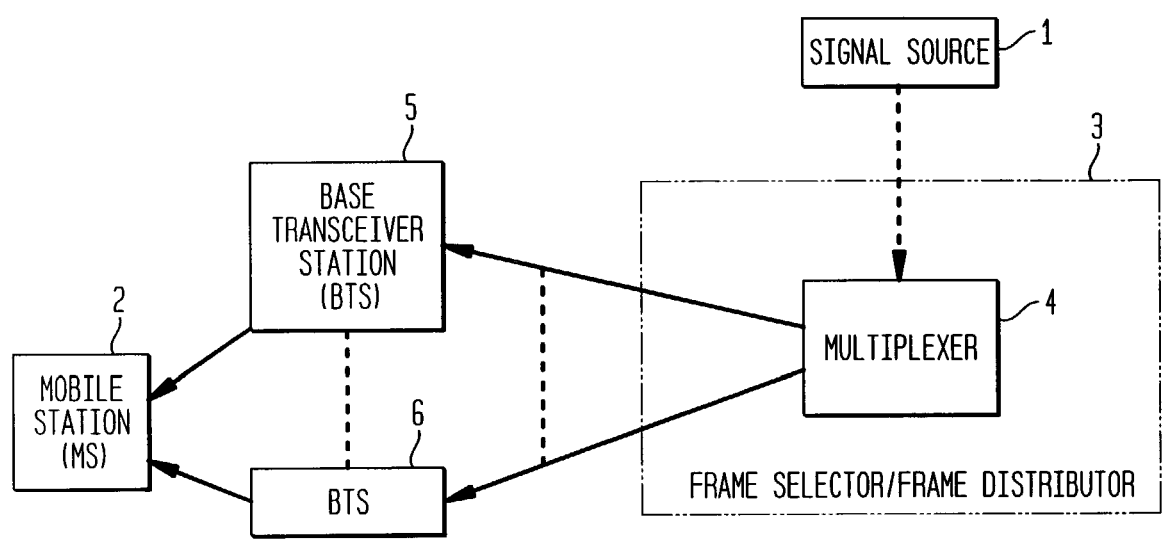

This invention relates to communications from base transceiver stations to CDMA (Code Division Multiplexing Arrangement) mobile stations, and more specifically, to arrangements for multiplexing signaling messages and voice frames being transmitted concurrently.

BACKGROUND

CDMA is rapidly becoming the predominant form of communication between mobile stations and the base transceiver stations that serve these mobile stations. Voice is transmitted to CDMA stations as a series of air-interface frames containing frames spaced at 20 millisecond intervals. The frames may be a full rate frame, a half rate frame, a quarter rate frame, or an eighth rate frame when coding arrangement is such that the minimum size satisfactory frame is used for each frame. Thus, when the direction of the signal toward the mobile station has a voice signal which is predominantly silence or background noise, this signal is transmitted as a series of one-eighth rate frames. When actual speech with a minimum of pauses is being transmitted, it is transmitted predominantly as a series of full rate frames. The advantage of using various sizes of frames is that power sent over the radio waves is conserved, thus maximizing the number of simultaneous conversations which can be supported. The signals from the base transceiver station to the mobile station also are used for conveying signaling messages. Examples of signaling messages are a direction to hand off a conversation, by tuning to a channel from which the mobile station is currently receiving a strong signal, and a neighbor list, which the mobile station uses to check for the strength of received radio signals. Since CDMA does not use a dedicated separate signaling channel, the signaling messages are multiplexed onto the same bit stream as the voice frames. The multiplexer takes a signaling message and cuts it into signaling fragments for combination with lower rate voice frames, producing full rate air-interface frames.

PROBLEM

According to the teachings of the prior art, signaling information is multiplexed onto the bit stream by two techniques: blank and burst (the voice frames are simply interrupted by the signaling frames, and are resumed when the signaling message has been transmitted); and dim and burst (full rate frames are forced to half rate and half rate, quarter rate, and eighth rate frames are filled with bits from the signaling message). The result of using blank and burst is that, while the signaling message is transmitted rapidly, there is a substantial degradation in the quality of the voice signal whenever a signaling message is transmitted; the result of using dim and burst is that signaling messages may be delayed excessively. A problem of the prior art is that there is no satisfactory arrangement for minimizing the degradation of the voice signal while still transmitting signaling messages with a minimum of delay.

In the prior art, digital circuit networks are used to interconnect base stations. Frame selectors and vocoders are frequently co-located. A signal multiplexer is used to optionally combine voice packets and signaling packets into combined frames. In order to reduce the delay of transmitting signaling information, a command is sent to the vocoder producing voice packets to limit the voice packets to half rate or less packets. A disadvantage of this arrangement is that the transmission of and response to such a command may incur substantial delay especially in packet voice networks where speech transcoding is remotely located from the base station, and that half rate voice frames introduce some degradation in the quality of speech.

In some cases, for transcoder-free operation, it is not possible to send such a command. In that case, the prior art can blank all full rate voice frames and substitute full rate signaling frames. This introduces substantial degradation in the quality of speech.

A problem of the prior art, therefore, is that there is no satisfactory way of reducing signaling delay without introducing degradation of speech.

SUMMARY OF THE INVENTION

The above problems are substantially alleviated in accordance with Applicants' invention, wherein dim and burst is used when half rate, quarter rate, and eighth rate voice frames are being transmitted, and when full rate frames are being transmitted, the transmission of a signaling message is halted for up to N full frames, after which a full frame is dropped. Full signaling frames are inserted instead of full rate voice frames. Applicants have applied simulation to demonstrate that the reduction in the quality of voice transmission using this type of arrangement is relatively modest for a value of N=3. For this value, the delay in transmitting signaling messages appears to be acceptable. This arrangement also produces satisfactory voice transmission on mobile to mobile calls without requiring the far end mobile station to generate only reduced rate voice frames.

In accordance with one preferred embodiment of Applicants' invention, up to N consecutive full rate voice frames can be transmitted before a following full rate voice frame is dropped in favor of a signaling frame, and this process can be repeated until some upper limit of deferred signaling frames is reached; thereafter, no more full rate signaling frames are deferred in favor of voice frames. Advantageously, with this arrangement, very long signaling messages can be transmitted in a satisfactory amount of time at the expense of a substantial degradation of the voice quality, while short signaling messages can be transmitted with a minimum reduction of voice quality; thus meeting the needs for transmission of occasional long signaling messages while maintaining voice quality while transmitting short signaling messages.

BRIEF DESCRIPTION OF THE DRAWING(S)

Figure 2:
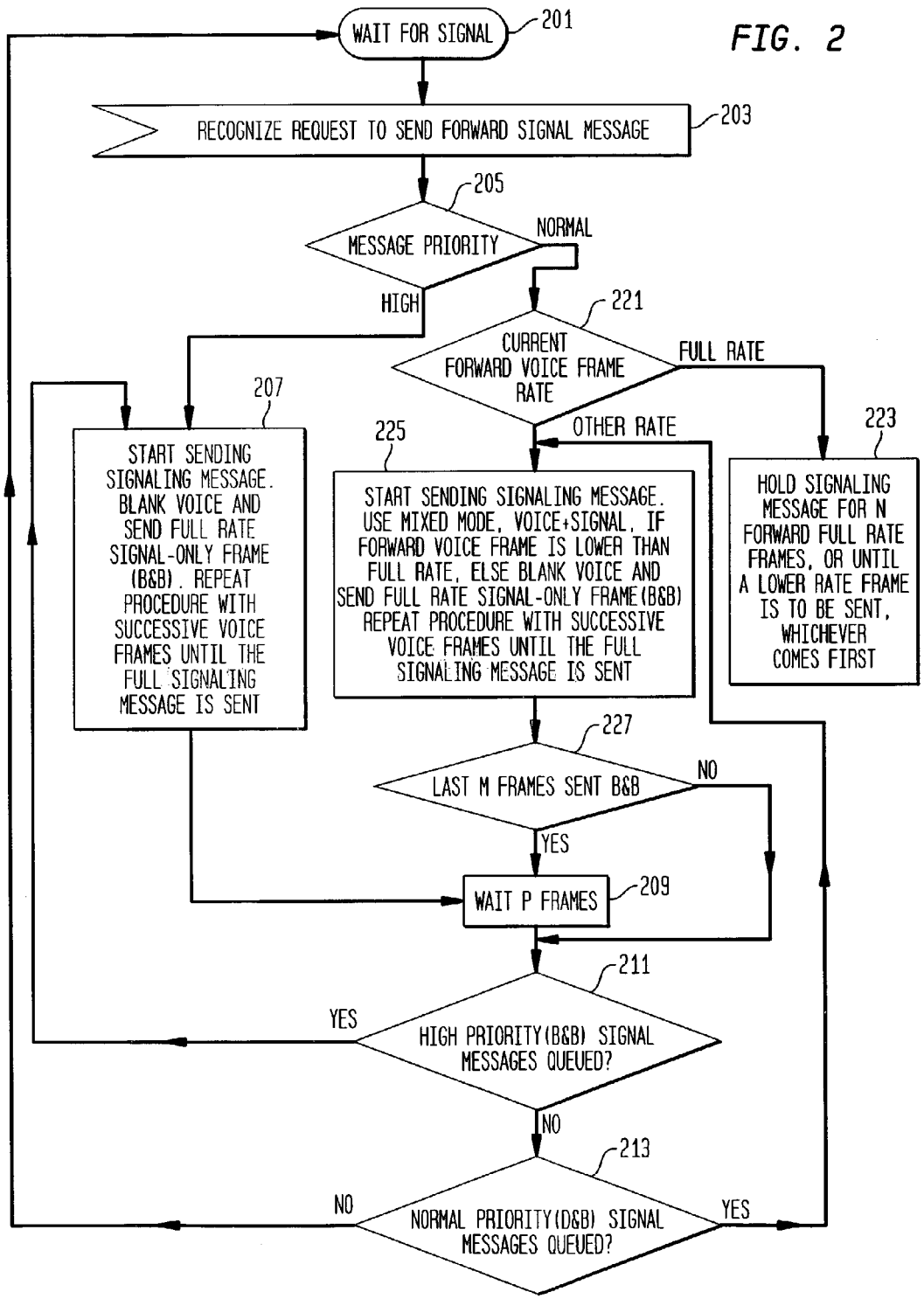

FIG. 1 is a block diagram illustrating the transmission of combined voice and signaling messages; and FIG. 2 is a flow diagram illustrating the operation of Applicants' invention.

DETAILED DESCRIPTION

FIG. 1 is a block diagram illustrating the transmission of combined signaling and voice messages to a mobile station. A signal source (1) finds it necessary to transmit a signaling message to a mobile station (2) (forward direction). In general, the signal source is likely to be a mobile switching system for controlling a plurality of base transceiver stations (5), . . . ,(6) and a plurality of mobile stations. The signal is sent from a signal source to a frame selector/frame distributor (3). In the forward direction, the frame distributor sends frames (either voice frames, signaling frames, or combined voice and signaling frames), to all of the base transceiver stations communicating with the selected mobile station. In the reverse direction, the frame selector receives voice frames from all of these base transceiver stations, and selects the voice frame with the strongest signal as the voice frame to be sent toward the party connected to the mobile station. Inside the frame selector/frame distributor is a multiplexer (4). This multiplexer receives incoming voice frames from the party connected to the mobile station. Incoming voice frames are combined in the multiplexer with the signaling message from the signaling source to generate a series of frames to be transmitted to the mobile station. The present invention relates to algorithms used by the multiplexer to combine the information in the incoming voice frames with the signaling message. The output of the multiplexer is then distributed to all of the base transceiver stations (5), . . . ,(6), which transmit these frames to the mobile station (2). The mobile station (2) uses a technique called "optimal combining" to combine the received frames to generate an optimum frame and uses that as the source of information for generating an analog voice signal, and for deriving the received signaling message.

FIG. 2 illustrates the operation of the multiplexer (3) in accordance with Applicants' invention. In the quiescent state of the multiplexer, the multiplexer is waiting for a signal, i.e., a signaling message. If no signaling message is present, the multiplexer simply transmits the voice message. The multiplexer waits for a signaling message (action block 201). At some point the multiplexer will recognize a request to send forward a signaling message (action block 203). Test 205 determines the priority of the message. If the priority of the message is high, then action block 207 is entered. In action block 207, the signaling message completely overrides any voice messages and simply is sent as a series of full rate signal only frames. These signal only frames are sent until the full signaling message has been sent. Thereafter, action block 209 is entered and P frames must elapse before any further signaling messages are transmitted.

The reason for waiting P frames in action block 209 is to reduce the interference with the voice message by allowing at least P frames of voice to go through unhampered between messages. This is only required if M frames of blank and burst (signal data only) had been encountered in sending the signaling message or if a high priority signaling message had been transmitted.

Thereafter, following execution of block 209 or the negative result of test 227, test 211 determines whether another high priority signaling message is queued. If so, action block 207 is reentered and a high priority signaling message is transmitted. If no high priority signaling messages are queued (negative result of test 211), then test 213 is used to determine whether any normal priority signaling messages are queued. If not, action block 201 ("wait for signal") is reentered. If a normal priority signal message is queued, then action block 225 (described hereinafter) is entered.

If the result of test 205, the test of original message priority following the original detection of a request to send a signaling message, finds that the priority of the message to be transmitted is a normal priority, then test 221 is entered. Test 221 determines if the forward voice frame rate of the current voice frame is full rate or other rate (i.e., half rate, quarter rate, or one eighth rate). If the current voice frame rate is a full rate, then in accordance with the principles of Applicants' invention, the signaling message is held up for up to N forward full rate frames or until a lower rate frame is to be sent whichever comes first (action block 223). When a lower rate frame is to be sent or N full rate frames have been sent, then the signaling message starts to be sent (action block 225). In this action, mixed mode (voice plus signal) frames are sent if the voice frame is lower than full rate. If the voice frame is full rate, then a full rate signal only frame is sent (blank and burst). This procedure is repeated with successive voice frames until the full signaling message is sent. A simple way of describing the actions of block 225 is to say that whenever a full rate frame is to be sent, a full signaling frame is substituted; when a voice frame that is less than full rate is to be sent, that voice frame is sent and the rest of the space in a frame is occupied by a portion of the signaling message. Following action block 225, test 227 determines whether the last M frames were sent in the blank and burst mode, i.e., were sent with no voice signal. If so, then action block 209 (wait P frames) is entered and subsequent actions are executed as previously described. If the last M frames were not consecutive blank and burst frames, then action block 211, previously described, is entered.

Action block 223 can be executed in one of two ways: the count can start following the result of test 221 or the count can be continuous so that if a series of full frames had already been transmitted prior to the detection of a signaling message, that action block 225 is entered more rapidly. The advantage of the second approach is that signaling messages are transmitted with less delay. The advantage of the first approach is that there is a chance that a lower amount of voice degradation is introduced.

Exact values of M, N, and P await determination based on field experience. However, based on simulations, the following values appear to be good tentative numbers: M=1, N=3, P=3. (Experimental tests may indicate other preferred values of P between 1 and 7.)

The above description is of one preferred embodiment of Applicants' invention. Other embodiments will be apparent to those of ordinary skill in the art without departing from the scope of the invention. The invention is limited only by the attached claims.

We claim:

1. A method of multiplexing a signaling message with voice frames in communications between base stations and CDMA mobile stations, comprising the steps of:

(a) responsive to receipt of a partial voice frame from a source, adding a portion of said signaling message to the partial frame to form a full frame, prior to transmission of that frame to a CDMA mobile station and transmitting the formed full frame to said CDMA station;

(b) responsive to reception of a full voice frame, when a request to send forward a signaling message has been recognized, transmitting said full voice frame with no signaling information of said signaling message to the CDMA mobile station provided that no more than N such full voice frames have been consecutively transmitted without any signaling information being carried in partial voice frames, wherein N is a parameter defined for the method;

(c) testing to determine a number of full voice frames that have been consecutively transmitted without transmission of any signaling information in partial voice frames, while a signaling message is queued for transmission to said CDMA mobile station; and (d) if said number is less than N, return to step (a);

(e) if said number is equal to or greater than N, substituting one signaling frame for a full voice frame and discarding the full voice frame for which the signaling frame is being substituted; and (f) following the substitution, return to step (a).

2. The method of claim 1 wherein a high priority signaling message is transmitted as a series of full frame signaling messages.

3. The method of claim 2 wherein following the transmission of a high priority signaling message, a gap of P frames is introduced in which no signaling information is transmitted, wherein P is a parameter defined for said method.

4. The method of claim 1 wherein N=3.

5. A multiplexer for multiplexing a signaling message with voice frames in communications between base stations and CDMA mobile stations, comprising:
  first means, responsive to receipt of a partial voice frame from a source, for adding a portion of said signaling message to the partial frame to form a full frame, prior to transmission of that frame to a CDMA mobile station and for transmitting the formed full frame to said CDMA station;
  second means, responsive to reception of a full voice frame, when a request to send forward a signaling message has been recognized, for transmitting said full voice frame with no signaling information of said signaling message to the CDMA mobile station provided that no more than N such full voice frames have been consecutively transmitted without any signaling information being carried in partial voice frames, wherein N is a parameter defined for said multiplexer;
  third means for testing to determine a number of full voice frames that have been transmitted without transmission of any signaling information in partial voice frames, while a signaling message is queued for transmission to said CDMA mobile station;
  if said number is less than N, fourth means for returning to said first means;
  if said number is equal to or greater than N, fifth means for substituting one signaling frame for one full voice frame and discarding the full voice frame for which the signaling frame is being substituted; and
  following the substitution, sixth means for returning to said first means for testing.

6. The apparatus of claim 5, wherein said multiplexer comprises means for transmitting a high priority signaling message as a series of full frame signaling messages.

7. The apparatus of claim 6 wherein following the transmission of a high priority signaling message, said multiplexer comprises means for introducing a gap of P frames in which no signaling information is transmitted;
  wherein P is a parameter defined for said multiplexer.

8. The multiplexer of claim 5 wherein N=3.

* * * * *